United States Patent [19]

Wakabayashi et al.

[11] Patent Number: 5,649,421
[45] Date of Patent: Jul. 22, 1997

[54] EXHAUST EMISSION CONTROL DEVICE

[75] Inventors: Mitsuo Wakabayashi; Shinichi Kikuchi; Morio Fukuda; Shouji Inose, all of Saitama, Japan

[73] Assignee: Honda Giken Kogyo Kabushiki Kaisha, Tokyo, Japan

[21] Appl. No.: 458,898

[22] Filed: Jun. 2, 1995

[30]    Foreign Application Priority Data

Dec. 26, 1994  [JP]  Japan .................................. 6-323076

[51] Int. Cl.⁶ .................................................. F01N 3/28
[52] U.S. Cl. ................................ 60/297; 60/284; 60/299
[58] Field of Search .............................. 60/299, 272, 297, 60/284

[56]            References Cited

U.S. PATENT DOCUMENTS 5,144,800  9/1992  Shioya ......................................... 60/299
5,163,289  11/1992  Bainbridge ................................ 60/299
5,331,810  7/1994  Ingermann .................................. 60/272

FOREIGN PATENT DOCUMENTS 6146869  5/1994  Japan .......................................... 60/297

*Primary Examiner*—Douglas Hart
*Attorney, Agent, or Firm*—Armstrong, Westerman, Hattori, McLeland & Naughton

[57]            ABSTRACT

An exhaust emission control device includes an HC convening first catalytic converter mounted in close proximity to an engine, and an HC converting second catalytic converter connected to the first catalytic converter through an exhaust pipe. A time point of starting of HC conversion by the second catalytic converter is set between a time point of completion of HC adsorption in the second catalytic converter and a time point of completion of HC desorption from the second catalytic converter. Thus, it is possible to reduce the amount of HC desorbed.

7 Claims, 4 Drawing Sheets

1

EXHAUST EMISSION CONTROL DEVICE

BACKGROUND OF THE INVENTION

1. Field of the Invention

The present invention relates to an exhaust emission control device and, more particularly to an improvement in an exhaust emission control device including an HC (hydrocarbon) converting first catalytic converter mounted in close proximity to an engine, and an HC converting second catalytic converter connected to the first catalytic converter through an exhaust pipe.

2. Description of the Related Art

The first and second catalytic converters in a device of this type exhibit an HC converting ability, after the adsorption of HC after the starting of an engine and the subsequent desorption of HC are conducted.

In this case, since the first catalytic converter is mounted in close proximity to the engine, the first catalytic converter reaches an HC desorption-completion temperature within a relatively short time, and therefore, the first catalytic converter exhibits the HC converting ability within a relatively short time after the start of the engine.

However, in general, the second catalytic converter is disposed below a vehicle floor because of a limitation of space. Therefore, the second catalytic converter is spaced far away from the engine, the second catalytic converter takes a relatively long time to reach the HC desorption-completion temperature. As a result, a large amount of HC is adsorbed in the second catalytic converter, and on the other hand, a large amount of HC is desorbed therefrom. This causes a problem in which a large amount of HC discharged at a CT time in an FTP mode in the prior art device.

SUMMARY OF THE INVENTION

It is an object of the present invention to provide an exhaust emission control device of the above-described type, wherein the time point of starting of the HC conversion by the second catalytic converter can be moved earlier to decrease the amount of HC discharged over the CT time in the FTP mode.

To achieve the above object, according to the present invention, there is provided an exhaust emission control device comprising an HC (hydrocarbon) converting first catalytic converter mounted in close proximity to an engine, and an HC converting second catalytic converter connected to the first catalytic converter through an exhaust pipe, wherein a starting time point for HC conversion by the second catalytic converter is set between a time point of completion of HC adsorption by the second catalytic converter and a time point of completion of HC desorption from the second catalytic converter.

If the time point of starting of the HC conversion by the second catalytic converter is set in the above manner, the amount of HC desorbed from the second catalytic converter over the CT time in the FTP mode is decreased.

In such a device, the amount of HC discharged over the CT time in the FTP mode can be decreased by cooperation of the first and second catalytic converters with each other, thereby enhancing the all-HC converting rate up to 98.2%.

The above and other objects, features and advantages of the invention will become apparent from the following description of a preferred embodiment taken in conjunction with the accompanying drawings.

DESCRIPTION OF THE PREFERRED EMBODIMENTS

Figure 1:
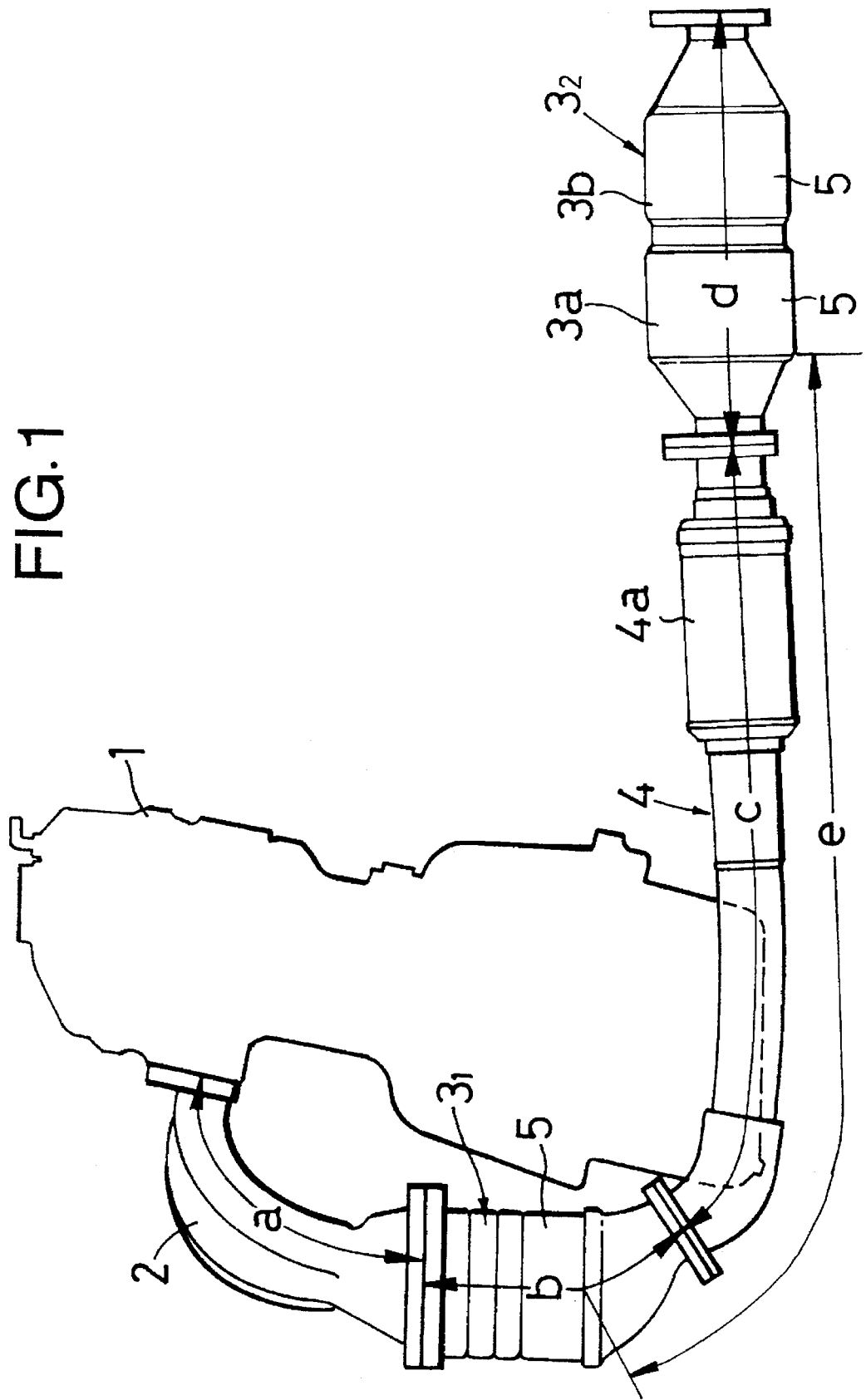
FIG. 1 is a schematic view illustrating the relationship of connection of an engine with an exhaust emission control device.

Referring to FIG. 1, an exhaust manifold 2 is connected to an engine 1. A first catalytic converter $3_1$ is connected to the exhaust manifold 2, and a second catalytic converter $3_2$ is connected to the first catalytic converter $3_1$ through an exhaust pipe 4. The first catalytic converter $3_1$ is disposed in close proximity to the engine 1, while the second catalytic converter $3_2$ is disposed below a vehicle floor and includes first and second portions $3a$ and $3b$ of the same construction. The exhaust pipe 4 has a flexible coupling $4a$ in the vicinity of the second catalytic converter $3_2$.

Each of the first and second catalytic converters $3_1$ and $3_2$ includes a honeycomb member of a cordierite having a catalytic element and accommodated in a vessel 5. The catalytic element includes a catalyst which is a mixture of Pt and Pd, an OSC and an alumina carrier which carries the catalyst and OSC.

Figure 2:
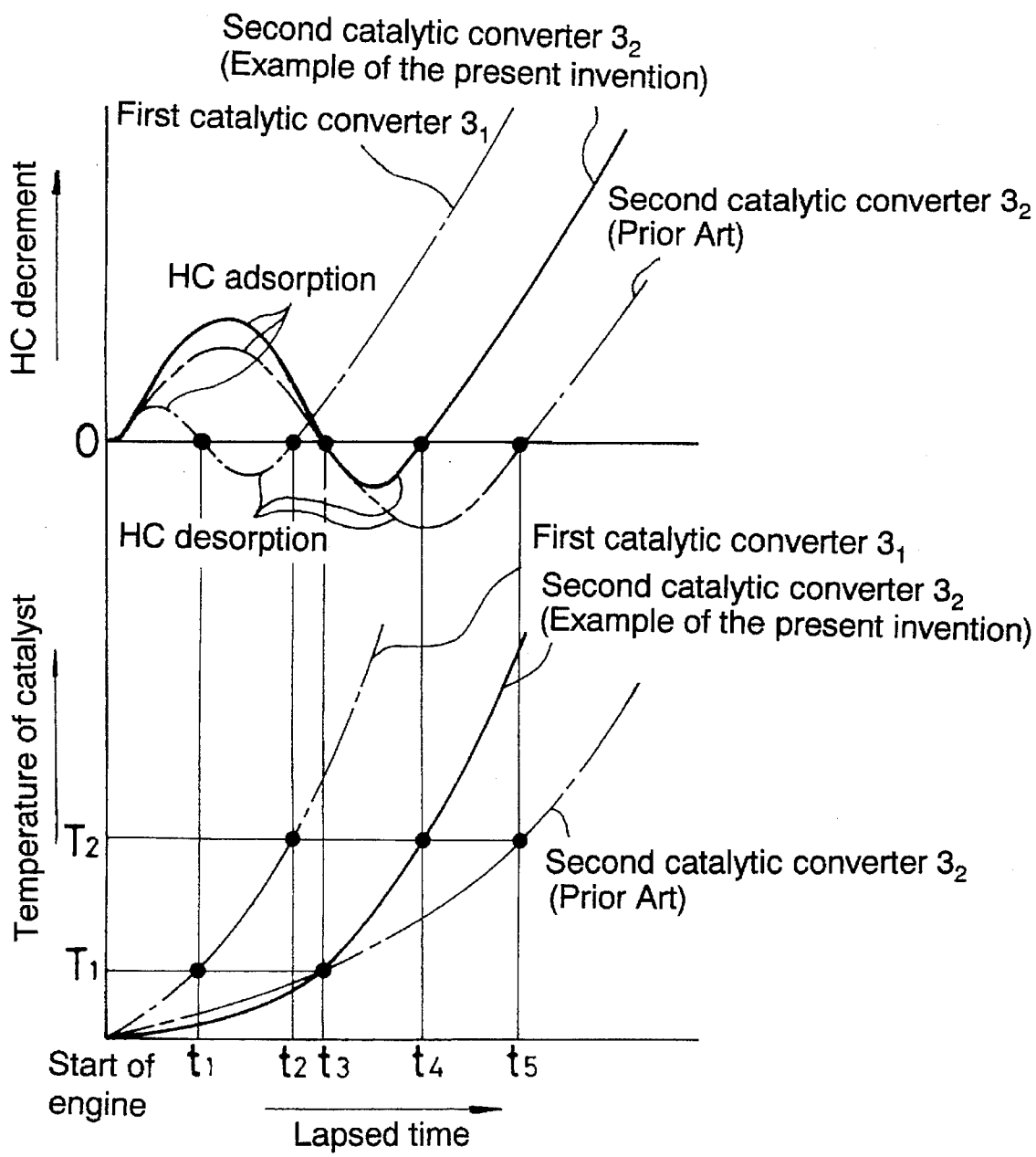
FIG. 2 is a schematic characteristic diagram illustrating characteristics of catalytic converters.

In the schematic characteristic diagram in FIG. 2, times $t_1$ and $t_2$ taken for the first catalytic converter $3_1$ and thus the catalyst to reach an HC adsorption-completion temperature $T_1$ and an HC desorption-completion temperature $T_2$ after starting of the engine are relatively short, because the first catalytic converter $3_1$ is disposed in close proximity to the engine 1. Therefore, the first catalytic converter $3_1$ exhibits an HC converting ability within a relatively short time after the starting of the engine. In this case, the amount of HC adsorbed by the catalyst is small and hence, the amount of HC desorbed is also small.

However, the prior art second catalytic converter $3_2$ is disposed at a location spaced far from the engine. Therefore, times $t_3$ and $t_5$ taken for the conventional second catalytic converter $3_2$ and thus the catalyst to reach the HC adsorption-completion temperature $T_1$ and the HC desorption-completion temperature $T_2$ are relatively long. As a result, the amount of HC adsorbed by the catalyst is large in the conventional second catalytic converter $3_2$ and on the other hand, the amount of HC desorbed is also large. Due to this, the amount of HC discharged over an CT time in a FTP mode is large in the prior art device.

Therefore, in the present invention, a time point $t_4$ of starting of the HC conversion by the second catalytic converter $3_2$ is set at a position between the time point $t_3$ of completion of the HC adsorption by the conventional second catalytic converter $3_2$ and the time point $t_5$ of completion of the HC desorption from the conventional second catalytic converter $3_2$.

If the time point $t_4$ of starting of the HC conversion by the second catalytic converter $3_2$ is set in the above manner, the amount of HC discharged over the CT time in the FTP mode can be decreased by cooperation of the first and second catalytic converters $3_1$ and $3_2$ with each other.

To set the time point of starting of HC conversion in second catalytic converter $3_2$ in the above manner, any of the following means (a) and (b) may be employed:

(a) The thickness of a partition wall in the honeycomb member is reduced to quicken the rising of the temperature of the second catalytic converter $3_2$; and (b) The structures of and materials for the exhaust manifold 2, the exhaust pipe 4 and the first catalytic converter $3_1$ are changed to adjust their heat capacity. If the heat capacity is too large, the rising of the temperature of the second catalytic converter $3_2$ is slowed down and hence, the time point $t_4$ of starting of HC conversion is retarded to cause an increase in the amount of HC desorbed. On the other hand, if the heat capacity is too small, the rising of the temperature of the second catalytic converter $3_2$ occurs too quickly and hence, the time point $t_4$ of starting of HC conversion may be shifted to a position prior to the time point $t_3$ of completion of HC adsorption, resulting in a decreased amount of HC adsorbed.

In addition, the amount of catalyst carried in the second catalytic converter $3_2$ can be increased, whereby the HC desorbed before the start of HC conversion in the first catalytic converter $3_1$ can be sufficiently adsorbed in the second catalytic converter $3_2$ to decrease the amount of HC discharged. Further, the number of cells in the honeycomb member in the second converter $3_2$ can be increased to increase the amount of catalyst carried, thereby enhancing the HC conversion rate after the time point $t_4$ of starting of HC conversion.

A specified example will be described below.

In the example of the present invention, the engine 1 used was a 4-cylinder engine with a displacement of 2,200 cc. The exhaust manifold 2 was made of a cast iron (JIS FCD550) and had a weight of 5.5 kg. In the first catalytic converter $3_1$, the honeycomb member had an outside diameter 105 mm and a length of 114 mm. The vessel 5 was made of a stainless steel (JIS SUS409), and the weight of the converter was 2.5 kg. The exhaust pipe 4 was made of a stainless steel (JIS SUS409) and had a weight of 3.0 kg. In the second catalytic converter $3_2$, the honeycomb member in each of the portions 3a, 3b has an outside diameter of 105 mm and a length of 81.2 mm. The vessel 5 was made of a stainless steel (JIS SUS409) and the weight of the converter was 3.5 kg.

The length a of a shortest portion of the exhaust manifold 2 was 310 mm; the length b of the first catalytic converter $3_1$ was 220 mm; the length c of the exhaust pipe 4 was 621.5 mm; the length d of the second catalytic converter $3_2$ was 330 mm; and the length e from a terminal end of the honeycomb member of the first catalytic converter $3_1$ to a front end of the honeycomb member of the first portion 3a in the second converter $3_2$ was 832 mm.

In each of the honeycomb members, the number of cells therein was 600 cells/in$^2$; the thickness of the partition wall was 4.3 mil. A mixture of Pt and Pd at a ratio of 1:8 and OSC were used as the catalyst, and the amount of catalyst carried was 337.5 g/ft$^3$.

As a comparative example, an exhaust emission control device having following conditions was prepared. The number of cells in each of honeycomb members was 400 cells/in$^2$, and the thickness of a partition wall was 7.2 mil. A mixture of Pt, Pd and Rh at a ratio of 3:5:1 and OSC were used as a catalyst, and the amount of catalyst carried was set at 67 g/ft$^3$. The other conditions were the same as in the example of the present invention.

For each of the example of the present invention and the comparative example, a vehicle having the exhaust emission control device mounted therein was driven 50,000 miles. Thereafter, the theoretic air-fuel ratio A/F immediately after the start of the engine was set at 14.8 to measure the decrement in HC.

Usually, the theoretic air-fuel ratio A/F is set at a rich level such as 12.9. In this case, HC is produced in a large amount, and the time point of starting of HC conversion in the second catalytic converter $3_2$ is late. For these reasons, the amount of HC adsorbed in the second catalytic converter is increased, and on the other hand, the amount of HC desorbed is also increased.

Thereupon, the theoretic air-fuel ratio is set at a lean level such as 14.8, thereby decreasing the amount of HC produced, and hastening the time point of starting of HC conversion, so that the amount of HC adsorbed is decreased, and the amount of HC desorbed is also decreased.

Figure 3:
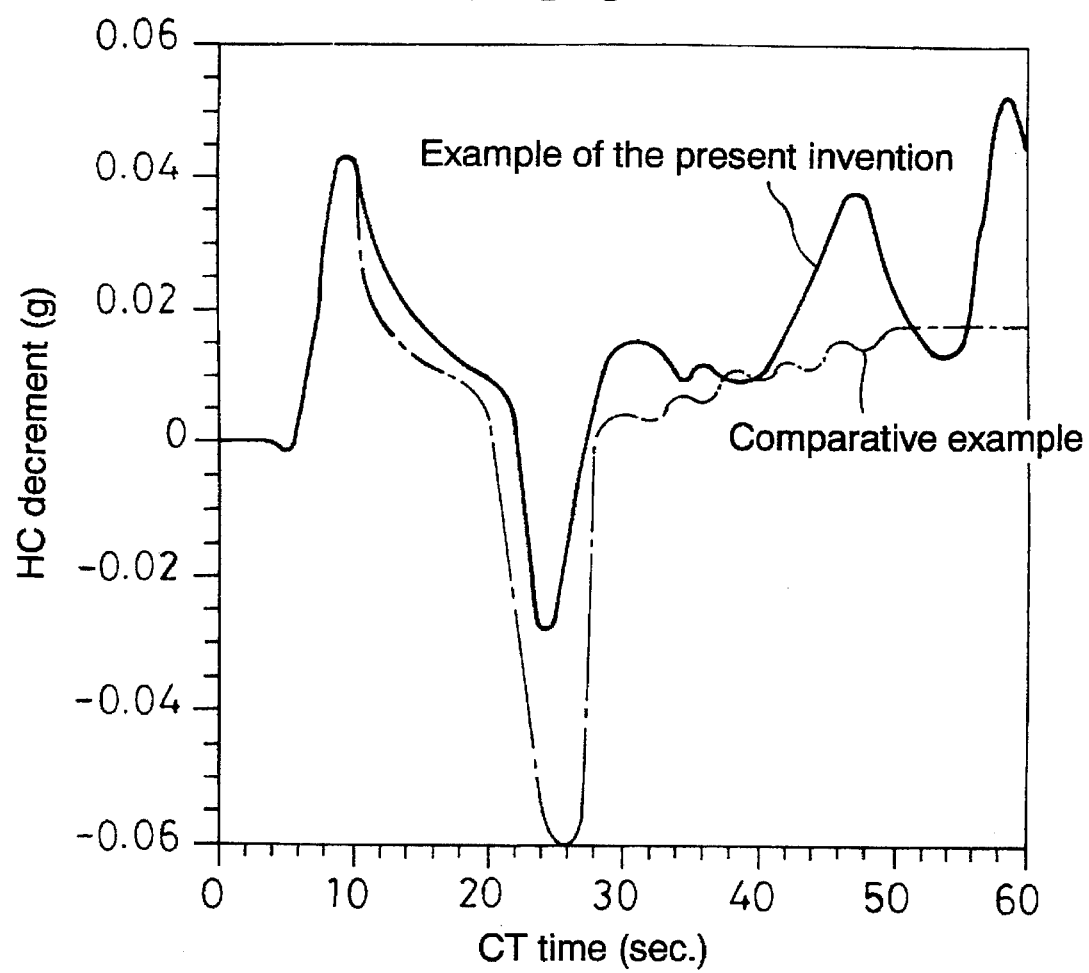
FIG. 3 is a graph illustrating the relationship between the CT time and the decrement in HC.

FIG. 3 illustrates the relationship between the CT time (FTP mode) for 60 seconds after the start of the engine and the HC decrement. For the CT time equal to 27 seconds while the engine 1 is operated at a theoretic air-fuel ratio A/F of 14.8, the HC decrement, namely, the amount of HC adsorbed in the example of the present invention from the start of the engine to a time point of about 22 seconds lapsed is larger than that in the comparative example. This is attributable to a difference between the amounts of catalysts carried. In addition, the HC decrement, namely, the amount of HC desorbed in the example of the present invention from the time point of about 22 seconds to a time point of 27 seconds lapsed is considerably decreased, as compared with that in the comparative example. This is nothing but attributable to the time point $t_4$ of starting of HC conversion in the second catalytic converter $3_2$ is made to occur earlier as described above. Further, after a lapse of 27 seconds, the theoretic air-fuel ratio is controlled to 14.6, and the HC decrement is exhibited at a high level in the example of the present invention, because the example has an excellent HC conversion characteristic, as compared with the comparative example.

Because of this, it was made clear that the HC conversion rate over the CT time of 0 to 125 seconds was 75.2% in the example of the present invention, but 53.5% in the comparative example, which is lower than that in the example of the present invention.

Figure 4:
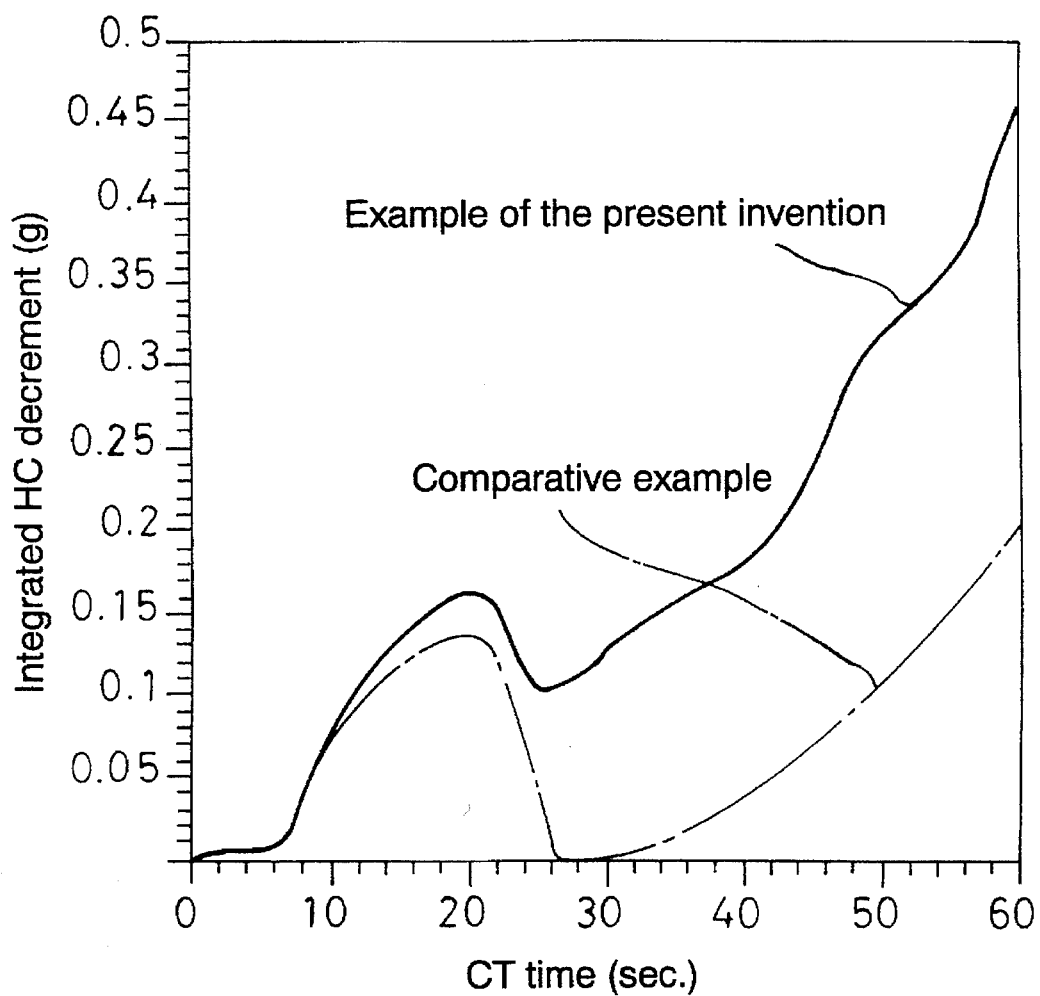
FIG. 4 is a graph illustrating the relationship between the CT time and the integrated decrement in HC.

FIG. 4 illustrates the relationship between the CT time and the integrated (or accumulated) HC decrement. Because the example of the present invention has the excellent HC conversion characteristic as described above, the integrated HC decrement was higher in the example of the present invention. As a result, it was made clear that the all-HC conversion rate was 98.2% in the example of the present invention, but 96.5% in the comparative example, which was lower than that in the example of the present invention.

What is claimed is:

1. An exhaust emission control device, comprising:
   an HC converting first catalytic converter mounted in close proximity to an engine; and
   an HC converting second catalytic converter connected to said first catalytic converter through an exhaust pipe, wherein a thickness of a partition wall in a honeycomb member in said second catalytic converter is made small so that a time point of starting of HC conversion by said second catalytic converter is set between a time point of completion of HC adsorption in said second catalytic converter and a time point of completion of HC desorption from said second catalytic converter.

2. An exhaust emission control device, comprising:
   an HC converting first catalytic converter mounted in close proximity to an engine; and
   an HC converting second catalytic converter connected to said first catalytic converter through an exhaust pipe, wherein an exhaust manifold connects said engine and said first catalytic converter and an exhaust pipe connects said first catalytic converter and said second catalytic converter, and wherein said exhaust manifold, said first catalyst converter and said exhaust pipe have respective heat transfer capacities which provide for a start of HC conversion by said second catalytic converter at a time point between a time point of completion of HC adsorption in said second catalytic converter and a time point of completion of HC desorption from said second catalytic converter.

3. An exhaust emission control device as recited in claim 2, wherein respective lengths of said exhaust manifold, said exhaust pipe and said first catalytic converter are set to values which provide the desired heat transfer capacities.

4. An exhaust emission control device as recited in claim 2, wherein respective shapes of structures of said exhaust manifold, said exhaust pipe and said first catalytic converter are selected to provide the desired heat transfer capacities.

5. An exhaust emission control device as recited in claim 2, wherein respective construction materials of said exhaust manifold, said exhaust pipe and said first catalytic converter are selected to provide the desired heat transfer capacities.

6. An exhaust emission control device as recited in claim 1 or claim 2, wherein an amount of catalyst carried in said catalytic converter is increased to a level whereby an amount of HC desorbed prior to a time point of starting of HC conversion in said first catalytic converter is sufficiently adsorbed in said second catalytic converter, thereby decreasing an amount of HC discharged.

7. An exhaust emission control device as recited in claim 1 or claim 2, wherein a number of cells in a honeycomb member in said second catalytic converter is increased, thereby increasing an amount of catalyst carried to a value whereby an HC conversion rate is increased after the time point of starting of HC conversion.

* * * * *